PLASTIC FILM ENCASED PACKAGE CONSTRUCTIONS

Original Filed May 11, 1964 3 Sheets-Sheet 1

INVENTOR.
MARION L. BROWN

BY Glenn, Filmer & Matthews
HIS ATTORNEYS

PLASTIC FILM ENCASED PACKAGE CONSTRUCTIONS

Original Filed May 11, 1964 3 Sheets-Sheet 1

INVENTOR.
MARION L. BROWN

BY Glenn, Palmer & Matthews
HIS ATTORNEYS

PLASTIC FILM ENCASED PACKAGE CONSTRUCTIONS

Original Filed May 11, 1964 3 Sheets-Sheet 3

INVENTOR.
MARION L. BROWN

BY Glenn, Palmer & Matthews

HIS ATTORNEYS

United States Patent Office

Re. 27,212
Reissued Nov. 2, 1971

27,212
PLASTIC FILM ENCASED PACKAGE CONSTRUCTIONS

Marion L. Brown, Richmond, Va., assignor to Reynolds Metals Company, Richmond, Va.

Original No. 3,331,503, dated July 18, 1967, Ser. No. 573,749, Aug. 2, 1966, which is a continuation of Ser. No. 366,424, May 11, 1964. Application for reissue Mar. 3, 1970, Ser. No. 16,271
Int. Cl. B65d *65/16, 71/00, 85/62*
U.S. Cl. 206—65 S 14 Claims

Matter enclosed in heavy brackets [ ] appears in the original patent but forms no part of this reissue specification; matter printed in italics indicates the additions made by reissue.

ABSTRACT OF THE DISCLOSURE

[This disclosure relates to a package construction means having an open ended receptacle means filled with product means, such as product container means or the like, disposed in a heat shrunk film-like tubular member whereby such heat shrunk film-like tubular member tightly compacts the product means and receptacle means together so that the resulting package construction means can be readily shipped and stored without requiring a conventional outer surrounding corrugated cardboard container, the receptacle means at the bottom of such package construction means providing support at the bottom four corners of the heat shrunk tubular film-like member and fully protecting the product means from impact at such four corners.]

*Package constructions having open ended receptacle means filled with product containers arranged in rows and disposed in a heat shrunk film-like member holding the receptacle means and product containers tightly together. A plurality of open-ended receptacle means, each filled with rows of containers, can be disposed in stacked relation within the heat shrunk tubular film-like member. These package constructions can be readily shipped and stored without requiring a conventional outer surrounding corrugated cardboard container, the receptacle means at the bottom of the package constructions providing support at the bottom four corners of the heat shrunk tubular film-like member and fully protecting the product containers from impact at the four corners.*

This application is a continuation of its copending parent patent application, Ser. No. 366,424, filed May 11, 1964, now abandoned.

This invention relates to an improved package construction as well as to an improved method for making such a package construction or the like.

It is well known that many products are shipped to various retail outlets in rectangular corrugated cardboard containers or the like whereby the retailer must open such containers to remove the product means for placement on merchandising shelves and the like.

For example, all canned, bottled and individually packaged grocery items and the like are normally shipped in such rectangular corrugated cardboard containers whereby a time consuming operation is required to remove the product means from the containers and place the same on the merchandising shelves thereof for display purposes and the like.

However, according to the teachings of this invention, an improved package construction for such product means or the like is provided wherein the product means are packaged in a transparent film-like material in a neat and attractive manner so that the entire package construction can be utilized for display purposes without requiring removal of the individual product means therefrom.

Further, the improved package construction of this invention requires less storage and shipping space than the prior known rectangular corrugated cardboard containers or the like as the improved package constructions of this invention are lighter in weight.

In addition, the package constructions of this invention can be easily handled in a unique and novel manner hereinafter described.

Accordingly, it is an object of this invention to provide an improved package construction having one or more of the novel features of this invention as set forth above or hereinafter shown or described.

Another object of this invention is to provide an improved method for making such a package construction or the like.

Other objects, uses and advantages of this invention are apparent from a reading of this description which proceeds with reference to the accompanying drawings forming a part thereof and wherein:

FIGURE 2 is a side view of the package construction illustrated in FIGURE 1 and illustrates the manner of lifting the same or the like.

FIGURE 4 is a side view illustrating the package construction of this invention in a display arrangement or the like.

FIGURE 6 is a top view illustrating one method of this invention for forming the package constructions of FIGURES 1 and 5 or the like.

Figure 1:
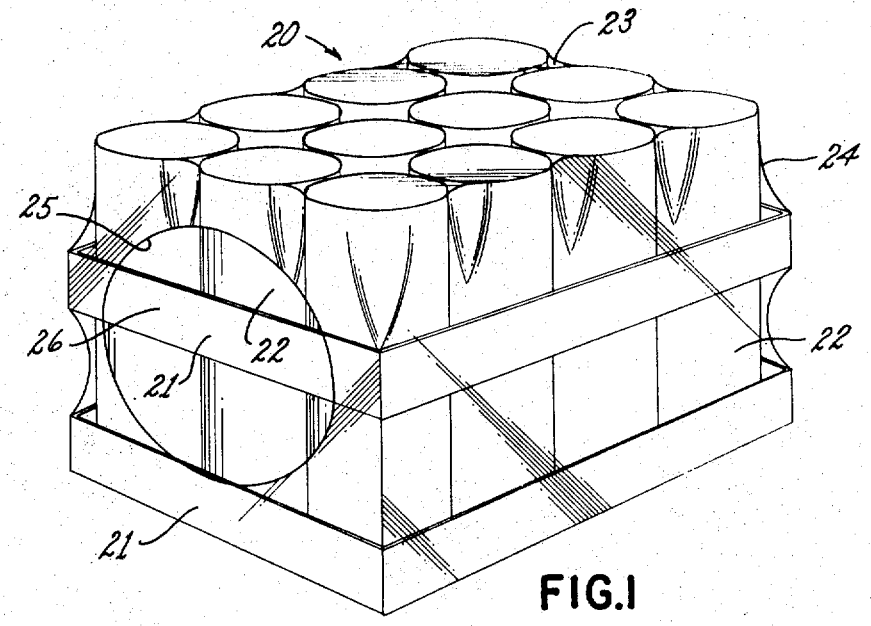
FIGURE 1 is a perspective view of one embodiment of the improved package construction of this invention.

While the various features of this invention are hereinafter described and illustrated as being particularly adaptable for packaging canned food products and the like, it is to be understood that the various features of this invention can be utilized to package any desirable type of product means or the like.

Therefore, this invention is not to be limited to only the embodiments illustrated in the drawings, because the drawings are merely utilized to illustrate one of the wide variety of uses of this invention.

Referring now to FIGURE 1, the improved package construction of this invention is generally indicated by the reference numeral 20 and comprises a plurality of open ended relatively shallow and rectangular receptacles 21 filled with product means, such as a plurality of metallic cans 22, and being surrounded by a tubular transparent film-like member 23 that has been heat shrunk in a manner hereinafter described to tightly compact the receptacle means 21 and product means 22 together to form the unique package construction 20.

The heat shrunk tubular member 23 has been shrunk in such a manner that the same tightly compacts the product means 22 and receptacles 21 together so that there is no shifting therebetween whereby a substantially integral package construction is provided.

Further, the opposed ends 24 of the transparent tubular member 23 overlaps the opposed ends of the substantially rectangular arrangement of product means 22 and receptacles 21 to hold the same together and provide opposed openings or access means 25 which expose the opposed ends 26 of one of the receptacles 21.

Figure 2:
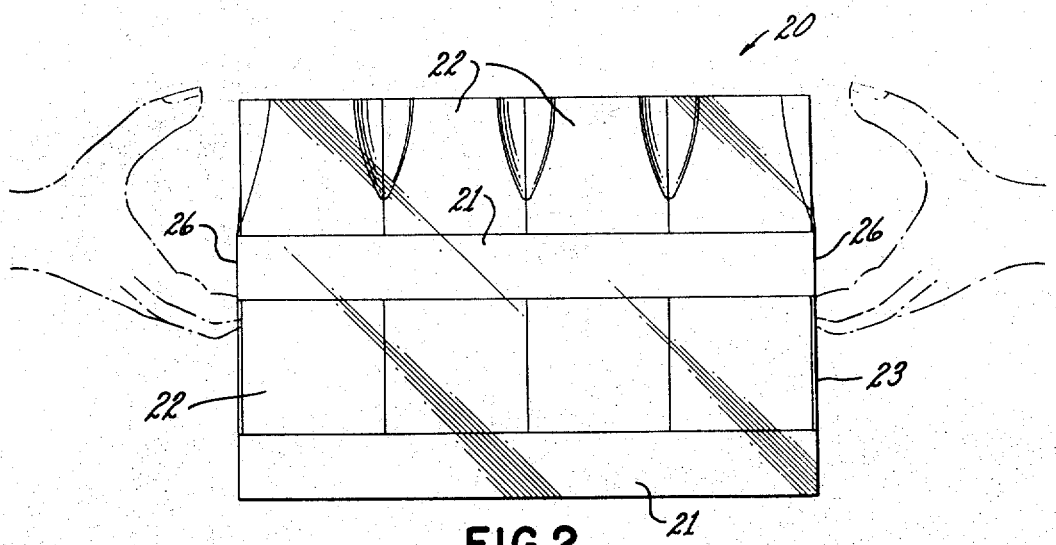
Figure 3:
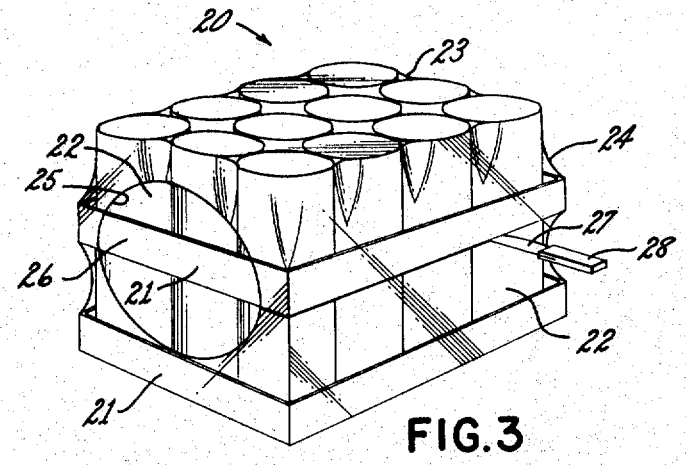
FIGURE 3 is a view similar to FIGURE 1 and illustrates one method for opening the package construction of this invention.

In this manner, it is relatively easy to lift and handle he package construction 20 of this invention by merely iaving the handler insert his hands respectively in the ›pposed openings 25 of the package construction 20 and rasp against the bottom of the opposed receptacle 21 n the manner illustrated in FIGURE 2 to lift and carry he package construction 20 without requiring removal ›f the transparent film-like member 23.

When it is desired to open the package construction 0 of this invention, the film-like member 23 can be eadily cut and removed from the product means 22 nd receptacles 21. For example, it can be seen in FIGJRE 3 that the blade 27 of a knife 28 can be inserted ›elow one of the receptacles 21 in the region of the ›pening 25 thereof and slit the film-like member 23 to he other opposed opening 25 therein so that the filmike member 23 can readily be unwrapped from the roduct means 22 and receptacles 21.

It has been found that such package constructions 20 f this invention are readily adapted for twenty-four ans 22 or the like wherein the entire package construction 20 weighs approximately 25 to 30 pounds. Howver, it must be understood that the number of cans 22 nd the weight thereof can vary as desired.

Such package constructions 20 of this invention readi- / permit the handlers and the like to view the labels on he cans 22 without requiring further labeling of the utside surfaces of the package construction 20. Howver, if desired, the side walls of the shallow receptacles 1 could be labeled or the like as the same will be readi- / viewable through the transparent covering 23.

It has been found that the transparent film-like memer 23 is so tightly drawn against the product means 22 ı the manner illustrated in FIGURE 1 that the same ›nds an overall attractive appearance to the product ıeans 22 not provided when the same are not covered y the film-like member 23.

Therefore, it has been found that attractive displays an be formed from a package means 20 of this invenion by arranging the same in stacked relation in the ıanner illustrated in FIGURE 4 whereby only the top ne or two package constructions 20 need have the verwrap 23 thereof removed in the manner illustrated ı FIGURE 4 for merchandising of the product means 2, the remaining or lower package constructions 20 roviding an attractive display which can be subsequently pened when needed.

Therefore, it can be seen that the package construcons 20 of this invention readily permits the same to e handled in the same way as the conventional rectanular corrugated cardboard containers without requiring me consuming removal of the product means 22 therecom to provide attractive displays for merchandising urposes and the like.

Further, when the individual package constructions 20 re opened, each receptacle 21 provides a tray for the roduct means 22, so that the product means 22 can be ›adily placed on shelves or the like while remaining in ıe respective tray 21.

While the package construction 20 of this invention as been previously described as having two filled recepıcle means 21, it is to be understood that the package ›nstruction 20 of this invention could be formed from ne or more filled receptacles 21 as desired.

Figure 5:
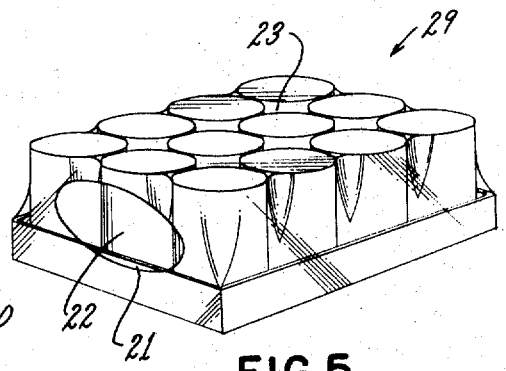
FIGURE 5 is a view similar to FIGURE 1 and illustrates another embodiment of the package construction of this invention.

For example, reference is made to FIGURE 5 wherei another package construction of this invention is genrally indicated by the reference numeral 29 and comrises a single receptacle 21 filled with product means 22 nd overwrapped by the heat shrunk transparent filmke material 23 of this invention.

While the package constructions 20 and 29 of this ıvention can be formed of any suitable material and in ny suitable manner, the embodiments thereof illustrated ı the drawings are formed by utilizing conventional corıgated cardboard receptacles 21 and a transparent polyvinylchloride heat shrinkable film-like material 23 having a thickness of approximately 1 to 1½ mils. However, it is to be understood that the materials forming the film-like material 23 and receptacles 21 of this invention can be other than those specified.

For example, almost any type of receptacle 21 can be utilized and the film-like material 23 of this invention can be polyethylene, polypropylene, and the like wherein the same has the heat shrinking or resilient characteristic to tightly compact the product means 22 and receptacles 21 together.

However, it has been found that when the film-like material 23 is formed of polyvinylchloride, the same has a relatively good impact resistance and when punctured, will not split and tear.

For example, the film-like material 23 can be formed of two webs of oriented polyvinylchloride fused together to provide a lamination suitable for the features of this invention.

Figure 6:
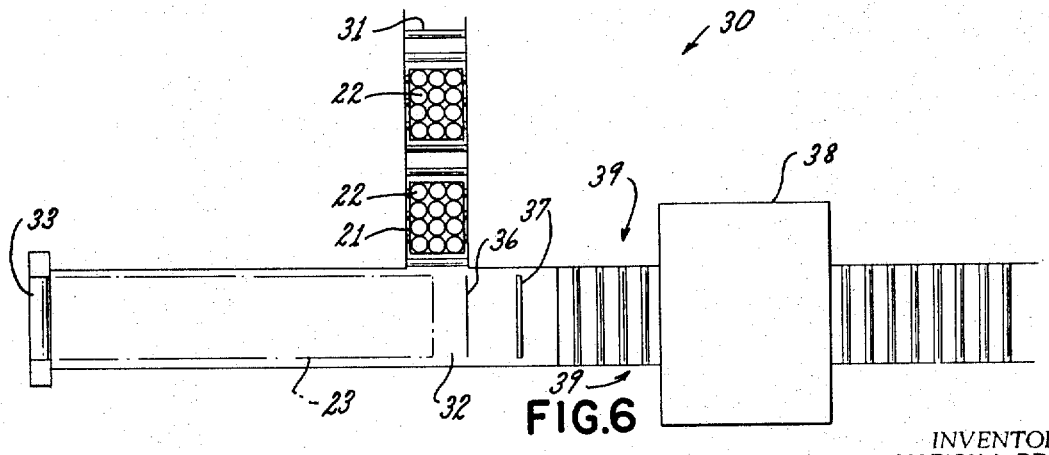

One method for forming the package constructions 20 and 29 of this invention is generally indicated by the reference numeral 30 in FIGURE 6 wherein filled and stacked receptacles 21 are fed down a conveying line 31 to a work table 32. The work table 32 includes a free wheeling supply roll 33 of the sheet material 23 which can be manually or automatically cut into flat blanks which can be subsequently wrapped around the filled and stacked receptacles 22.

Figure 7:
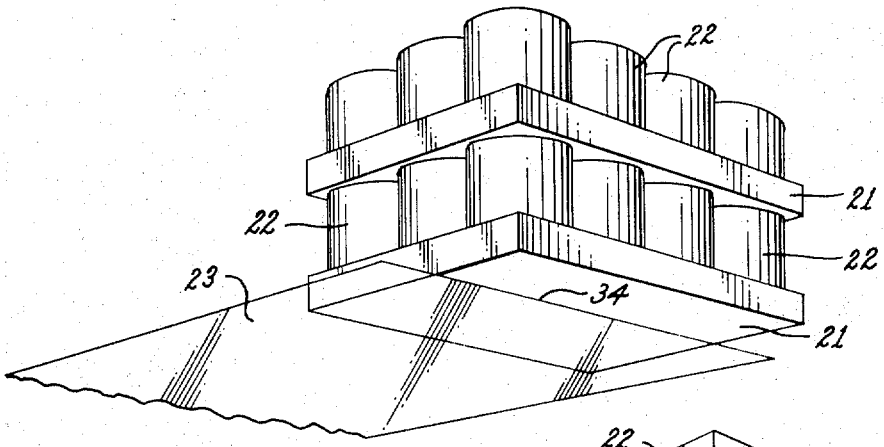
FIGURES 7–10 are respectively perspective views illustrating the various steps in the operation of forming the package construction of this invention by the method illustrated in FIGURE 6.
Figure 8:
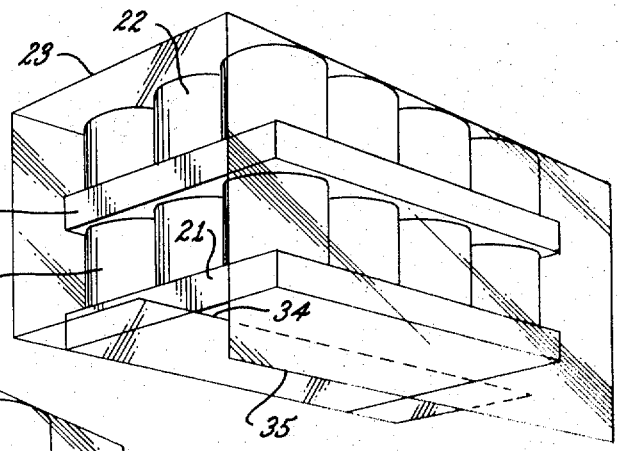

For example, it can be seen in FIGURE 7 that a plurality of stacked and filled receptacles 21 are moved onto the platform 32 so that the bottom receptacle 21 overlaps the front edge 34 of a sheet of film-like material 23. With the filled and stacked receptacles 21 in the position illustrated in FIGURE 7, the other end 35 of the sheet material 33 is wrapped around the filled and stacked receptacles 21 in the manner illustrated in FIGURE 8 so that the free end 35 of the sheet of material 23 can be disposed in a slot means 36 formed in the work table 32.

Figure 9:
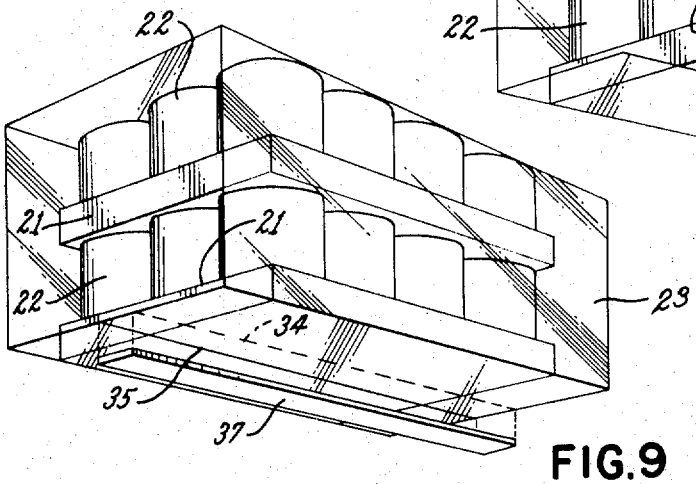

Thereafter, the filled and stacked receptacles 21 are moved to the right in FIGURE 6 whereby the end 35 of the sheet material 23 is brought in overlapping relation over the other end 34 thereof in the manner illustrated in FIGURE 9 and is heat sealed thereto by a heat sealing bar 37 disposed flush with the table 32 in the manner illustrated in FIGURE 6.

Thus, it can be seen that the sheet of material 23 is now formed in a tubular form around the filled and stacked receptacles 21 in the manner illustrated in FIGURE 9 whereby the opposed ends of the tubular film-like material 23 extend beyond the opposed ends of the receptacles 21.

Figure 10:
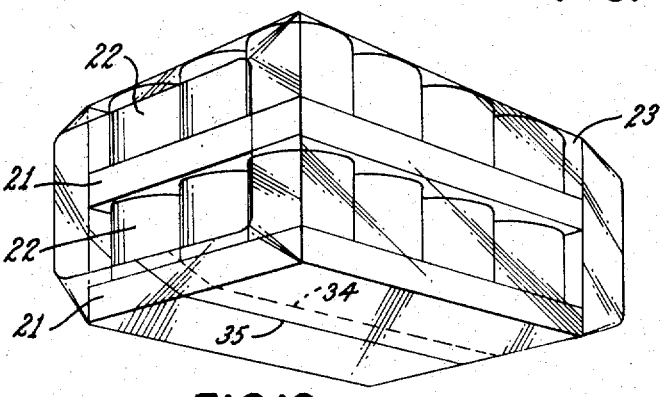

Before the combination illustrated in FIGURE 9 is moved to the right on the work table 32 into a heating chamber 38, the opposed ends of the tubular film-like member 23 are pre-shrunk to substantially the position illustrated in FIGURE 10 by operators or automatic means disposed in the region of the reference numerals 39 in FIGURE 6 whereby the opposed ends of the film-like material 23 are partially shrunk around the opposed ends of the filled and stacked receptacles 21.

Thereafter, the combination illustrated in FIGURE 10 is moved into the heating chamber 38 in FIGURE 6 to have the film-like material 23 heat shrunk to form the package construction as illustrated in FIGURE 1 before the same leaves the heating chamber 38 for subsequent handling thereof.

Therefore, it can be seen that the package constructions 20 of this invention can be readily formed by having the film-like material 23 disposed in coiled form and be subsequently wrapped around the filled and stacked receptacles 21 in the manner illustrated in FIGURE 9.

However, it is to be understood that the film-like material 23 of this invention could be formed in tubular form without having any longitudinal seams thereof so that the filled and stacked receptacles 21 could be inserted therein without requiring a longitudinal seaming operation as illustrated in FIGURE 9. For example, the film-like material 23 could be formed by an extrusion process where the same is formed in a continuous tubular length.

The finished package constructions 20 and 29 of this invention readily adapt themselves to be palletised for subsequent handling thereof in the same manner as the conventional surrounding rectangular corrugated cardboard containers.

While the package construction 20 of this invention has many advantages over the conventional rectangular corrugated cardboard shipping container normally utilized in the field, only some of the advantages will now be described.

In just weight savings alone, it has been found that a savings of approximately $6 has been provided by the package constructions 20 of this invention per carload of package constructions 20 over the conventional cardboard containers. For example, it has been found that the weight differential between the package constructions 20 of this invention and the corrugated cardboard containers is approximately 0.7 pound per case whereby the weight savings per carload of package constructions 20 is approximately 2,289 pounds over the conventional cardboard containers for like product means.

Further, it has been found that when cans and the like are shipped in the conventional cardboard containers, the same have chime ride marks on the labels thereof during shipment whereby the cans are unattractive for display purposes. However, the film-like material 23 of this invention locks the cans 22 and receptacles 21 together in such a manner that no chime riding is permitted.

The attractiveness of the package construction 20 of this invention has the advantage of being a new type of package construction which will help the canning industry to sell their products. Further, the supermarkets and the like through the country need to reduce their handling costs in displaying merchandise whereby with the package construction 20 of this invention, the film-like material 23 can be readily removed by slitting and be rolled in a ball to be thrown away thereby eliminating the unfolding and flattening of the conventional cardboard containers.

Figure 4:
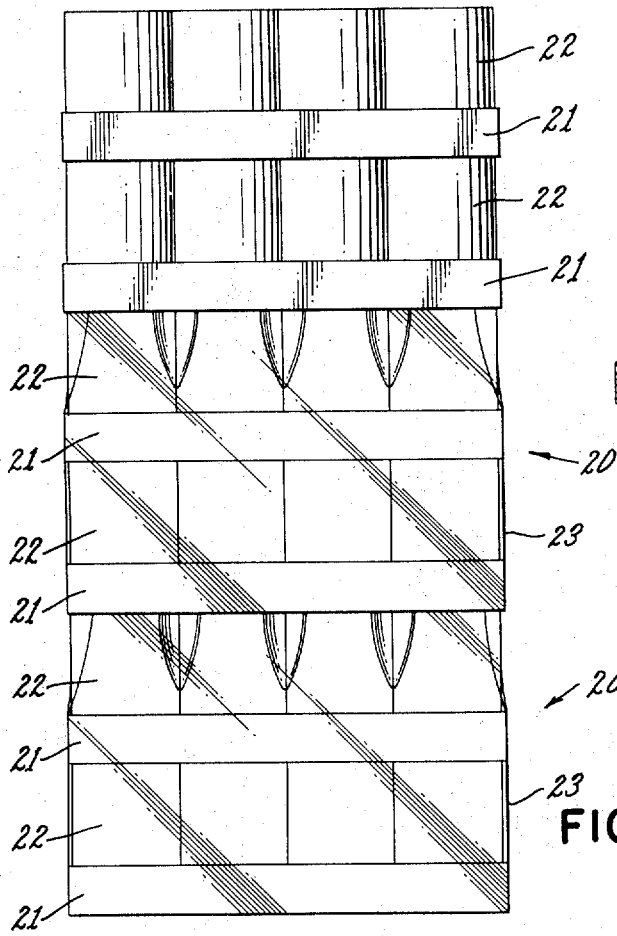

Further, the product means 22 of this invention are kept clean until the housewife or the like selects the product from the shelf because the same can be arranged in display manner similar to FIG. 4.

In addition, the transparent film-like material 23 is a natural eye catcher to give visual impact on the shelf and in corner displays and the like.

Another feature provided by the package constructions of this invention is that the same can be used in displays without removing the film-like material 23 so that any unsold product will not have to be recased for shipment back to the product manufacturer.

Another disadvantage of the conventional corrugated cardboard container is that the same is slippery and difficult to pick up by handlers whereas the exposed top tray or receptacle 21 of this invention is readily exposed to provide handle means for a lifting point for the workers.

Therefore, it can be seen that the improved package construction 20 of this invention has many advantages over the prior known package constructions and none of the disadvantages thereof.

Accordingly, this invention not only provides an improved package construction, but also this invention provides an improved method for making the same or the like.

While the form of the invention now preferred has been disclosed as required by statute, other forms may be used, all coming within the scope of the claimed subject matter which follows.

What is claimed is:

1. In combination, open ended receptacle means filled with [product means] *a plurality of cylindrical containers arranged in rows therein,* said receptacle means including a substantially flat rectangular bottom wall having the four corners thereof disposed outboard of all of said [product means] *cylindrical containers* to fully protect said [product means] *cylindrical containers* from impact at said four corners, *continuous receptacle sidewall means extending perpendicularly upwardly from the peripheral edge of said bottom wall and terminating below the tops of said cylindrical containers so that said cylindrical containers extend above the top edge of said receptacle sidewall means,* and a heat shrunk tubular film-like member receiving said filled receptacle means to hold said receptacle means and said [product means] *cylindrical containers* tightly together, *the ends of* said film-like member overlapping the opposed ends of said filled receptacle means whereby *opposed openings are provided at the opposed ends of said filled receptacle means and* said bottom wall means of said receptacle means provides support at the bottom four corners of said heat shrunk tubular film-like member.

[2. A combination as set forth in claim 1 wherein said overlapping portions of said film-like tubular member provide opposed openings at the opposed ends of said product filled receptacle means.]

[3. A combination as set forth in claim 1 wherein said receptacle means includes continuous side wall means extending upwardly from the peripheral edge means of said bottom wall means.]

[4. A combination as set forth in claim 3 wherein said product means extend above the top edge of said side wall means.]

5. A combination as set forth in claim [4] *1* wherein said receptacle means includes at least two receptacles each being filled with said [product means] *cylindrical containers arranged in rows* and being disposed in stacked relation inside said tubular film-like member.

6. In combination, a plurality of product supporting means having a plurality of [product means] *upstanding cylindrical containers arranged in rows and* arranged thereon to be carried thereby, said product carrying supporting means being disposed in stacked relation, and a heat shrunk tubular film-like member receiving said stacked and product carrying supporting means and overlapping the opposed ends of said stack to hold said supporting means and [product means] *cylindrical containers* together whereby the lower supporting means provides support at the bottom four corners of said heat shrunk tubular member, said tubular film-like member providing openings at said opposed ends whereby the exposed ends of one of said supporting means can be grasped for lifting said entire combination.

7. In combination, a plurality of receptacles having the open ends thereof receiving a plurality of containers arranged in rows therein, said filled receptacles being placed in stacked relation, and a heat shrunk transparent tubular film-like member receiving said stacked and filled receptacles and overlapping the opposed ends of said stack to hold said receptacles and containers together, whereby the lower receptacle provides support at the bottom four corners of said heat shrunk tubular member, said tubular film-like member providing openings at said opposed ends whereby the exposed ends of one of said receptacles can be grasped for lifting said combination.

8. A combination as set forth in claim 7 wherein said tubular film-like member is provided by a flat blank having opposed edges thereof heat sealed together to form said tube.

9. A combination as set forth in claim 7 wherein said tubular film-like member has no longitudinal seam.

10. A combination as set forth in claim 7 wherein said film-like member comprises polyvinylchloride.

11. A combination as set forth in claim 10 wherein said film-like member comprises two sheets of said polyvinylchloride superimposed on each other and laminated together.

12. In combination, a plurality of opened ended reeptacles respectively having a plurality of containers rranged in rows therein with each container extending bove the top edge of its respective receptacle, said filled eceptacles being placed in stacked relation to form a subtantially rectangular arrangement, and a heat shrunk ransparent tubular film-like member receiving said recangular arrangement to hold said receptacles and conainers together, said film-like member overlapping the pposed ends of said rectangular arrangement and proiding access means thereto at said opposed ends whereby ne lower receptacle provides support at the bottom four orners of said heat shrunk tubular member.

*13. A combination as set forth in claim 1 wherein the ylindrical containers comprise metallic cans.*

*14. A combination as set forth in claim 1 wherein said lm-like member is transparent and said cylindrical conainers are cans having labels visible through said filmke member and tops which collectively provide a flat surace permitting the stacking of a plurality of said package onstructions one upon the other.*

*15. A combination as set forth in claim 1 wherein at aid four corners adjacent sidewall means are perpendiclar to each other and to said bottom wall.*

*16. A combination as set forth in claim 15 wherein he bottoms of said cylindrical containers rest flat on aid receptacle bottom wall and the cylindrical surface f each said container is, along four vertical lines equally paced therearound, laterally adjacent either to the entire eight of the corresponding cylindrical surfaces of other ontainers or to the entire height of said receptacle sidevall means.*

*17. A combination as set forth in claim 16 wherein aid film-like member compacts said cylindrical containers ightly to prevent shifting therebetween and so that the esulting package construction is substantially integral and ay be readily shipped and stored without a further surounding container.*

References Cited

The following references, cited by the Examiner, are of record in the patented file of this patent or the original patent.

UNITED STATES PATENTS

| | | | |
|---|---|---|---|
| 2,425,536 | 8/1947 | Hofeldt et al. | 206—44 R |
| 2,679,969 | 6/1954 | Richter | 229—3.5 R |
| 2,896,781 | 7/1959 | Demarest | 206—65 B |
| 3,043,490 | 7/1962 | Burnett | 229—15 |
| 3,111,221 | 11/1963 | Chapman et al. | 206—65 S |
| 3,166,878 | 1/1965 | Pepitone et al. | 53—30 |
| 3,187,478 | 6/1965 | Kirkpatrick | 53—30 |

OTHER REFERENCES

U.S. Dept. of Agriculture, marketing research report No. 534, "Prepackaging Medium Size Apples in Shrinkable Film at Shipping Point," 4, 1962.

A Reynolds Metals Co. presentation to Safeway Stores, Inc., Nov. 2, 1960, of produce packages using trays and an overwrap of shrunk PVC.

Modern Packaging, March 1961, p. 13.

Modern Packaging, June 1961, p. 13.

Modern Packaging, July 1961, Dobeckmun advertisement.

Modern Packaging, July 1960, pp. 132–133.

Modern Packaging, May 1960, pp. 121–126 and 226.

Modern Packaging Encyclopedia, 1963, pp. 1, 288–294, 296, 426, 427, 429 and 430.

WILLIAM T. DIXSON, Jr., Primary Examiner

U.S. Cl. X.R.

53—30; 206—45.33; 229—DIG 12